United States Patent

[11] 3,592,967

[72] Inventor George A. Harris
 7764 W. 14th Court, Hialeah, Fla. 33014
[21] Appl. No. 736,917
[22] Filed May 20, 1968
[45] Patented July 13, 1971

[54] ULTRASONIC DETECTOR
 4 Claims, 7 Drawing Figs.
[52] U.S. Cl.......................................................... 179/1 A,
 73/71.4, 310/8.2, 330/174
[51] Int. Cl.......................................................... H01v 7/00,
 H03f 13/00
[50] Field of Search............................................ 73/67, 69,
 71.4; 330/174; 179/1, 1 A; 310/8.2

[56] References Cited
UNITED STATES PATENTS

| | | | | |
|---|---|---|---|---|
| 2,046,765 | 7/1936 | Braden | | 330/174 X |
| 2,137,852 | 11/1938 | Nicolsen | | 330/174 X |
| 2,601,474 | 6/1952 | VanZelst | | 179/1 |
| 3,109,111 | 10/1963 | Wiggins | | 310/8.2 |
| 3,222,635 | 12/1965 | Simpkins et al. | | 340/15 |
| 3,253,457 | 5/1966 | Pakala et al. | | 73/71.4 |
| 3,365,935 | 1/1968 | Kane | | 73/71.4 |
| 3,421,109 | 1/1969 | Wiggins et al. | | 330/174 |

*Primary Examiner*—Kathleen H. Claffy
*Assistant Examiner*—William A. Helvestine
*Attorney*—Burmeister, Kulie, Southard and Godula ABSTRACT: This application discloses a detector for leaks which generate ultrasonic waves, such as illuminating gas leaks, and electrical leaks of the corona or arcing types. An ultrasonic detector is utilized to respond to the ultrasonic waves generated by the turbulence in the atmosphere caused by such leaks, and the electrical signals generated by the ultrasonic transducer are utilized to produce an indication of the presence of the leak, either an audible or visual indication.

This application also discloses a band-pass ultrasonic interstage coupler employing piezoelectric elements, and a combination local oscillator and band-pass interstage ultrasonic wave coupler employing piezoelectric elements.

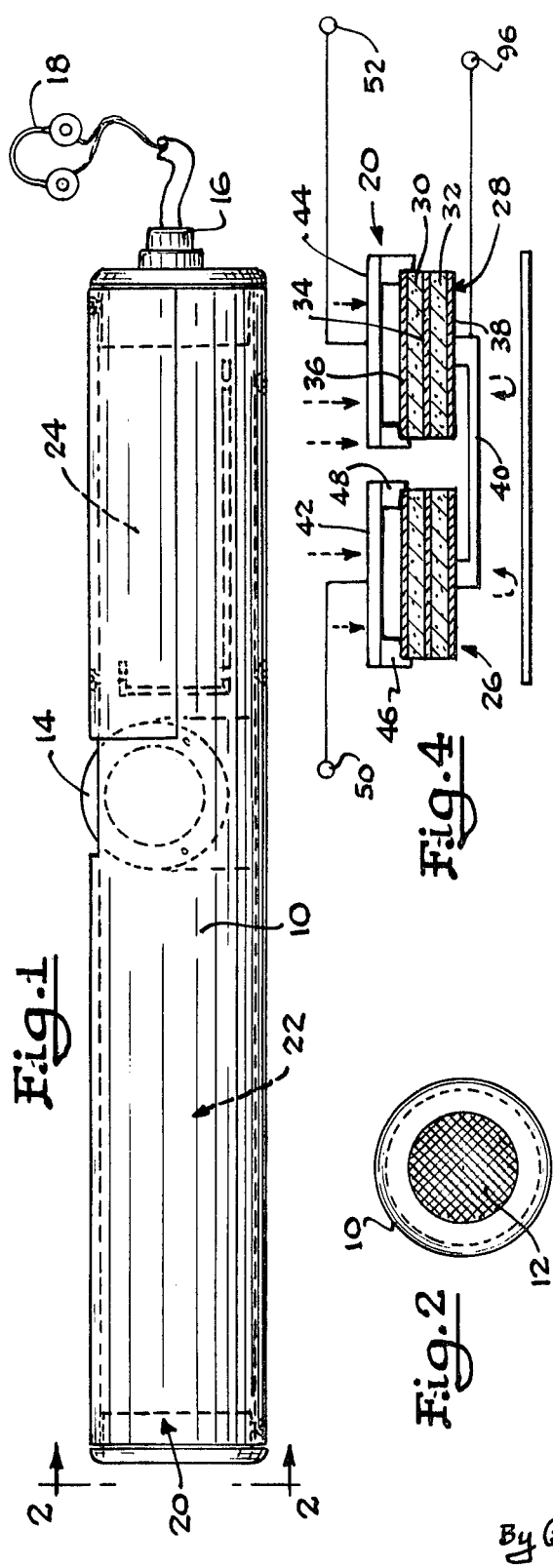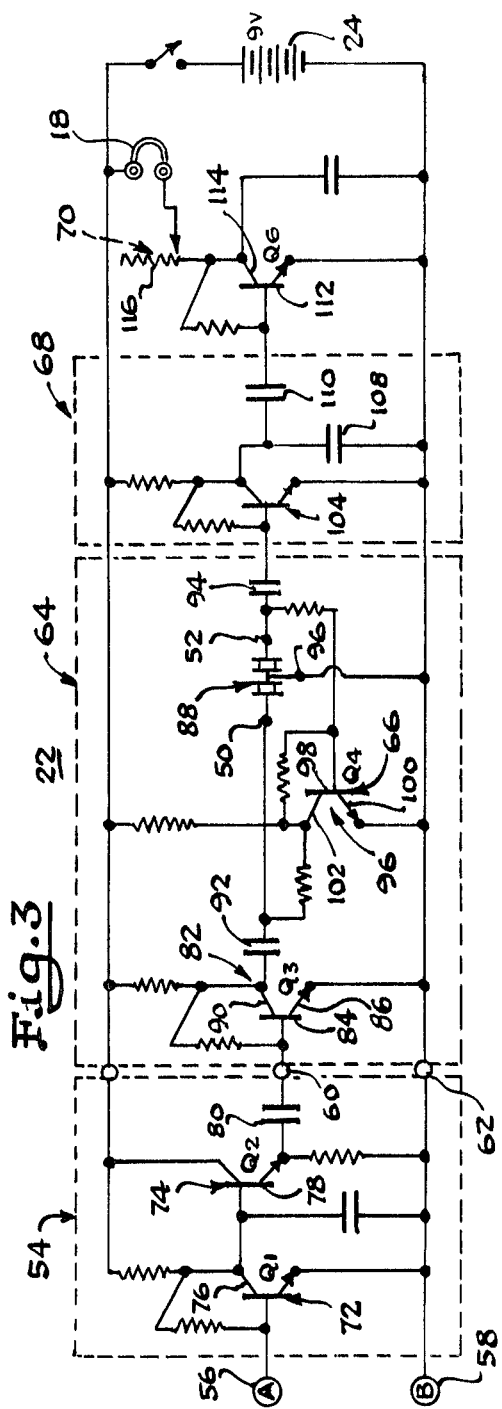

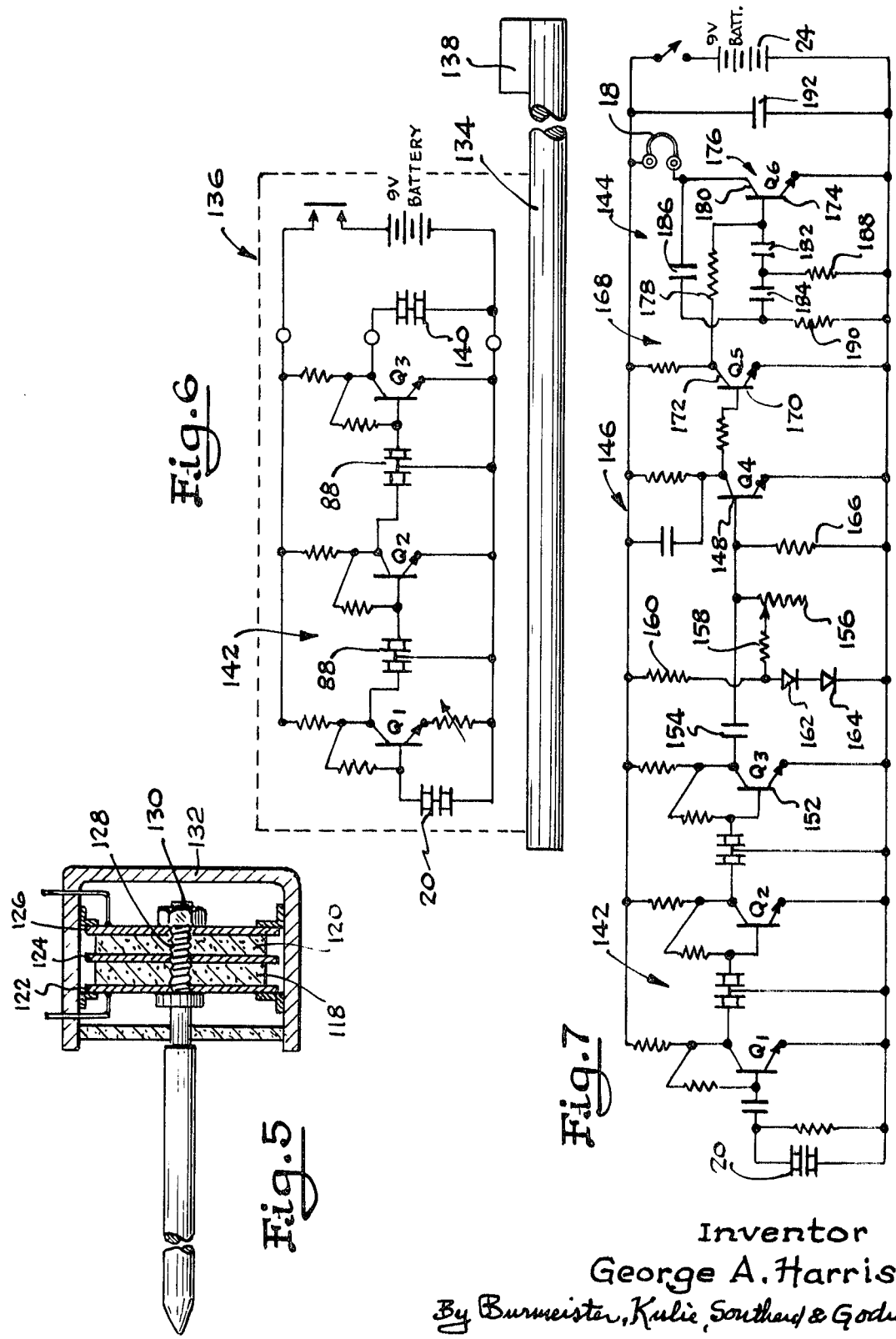

ULTRASONIC DETECTOR

The present invention relates to devices for responding to the presence of ultrasonic waves, and in particular to devices for detecting leaks which produce air turbulence, such as gas leaks, and electrical leaks of the corona or arcing types. In addition, the present invention relates to electrical devices for amplifying and utilizing electrical signals having frequencies in the range of ultrasonic waves.

It has been known that gas leaks produce turbulence which may be detected by the human ear, and which is more readily detected by a stethoscope. The present invention is directed to utilizing sound waves in the ultrasonic range which are generated by such leaks, that is, in the frequency range extending from approximately 20 kilocycles to the low frequency radio waves.

Devices have existed prior to the present invention for detecting the presence of ultrasonic waves. U.S. Pat. No. 3,109,111 of Alpha M. Wiggins entitled "Ultra-Sonic Microphone," dated Oct. 29, 1963, is directed to an efficient transducer for converting ultrasonic energy into electrical energy. Such devices have in the past been utilized for a control of television receivers from remote locations, or for the actuation of switches. In accordance with the present invention, the electrical output of such an ultrasonic microphone is amplified and utilized to produce an audible indication of the presence of ultrasonic waves, either by conversion of the electrical signal from a frequency corresponding to the ultrasonic wave to a signal corresponding to the audio waves, or by actuating an alarm.

It has been conventional practice to amplify electrical signals produced by microphones, and such amplifiers generally consist of a plurality of stages electrically interconnected by some form of interstage coupling. The most frequently utilized interstage coupling mechanisms are either capacitive and resistive elements, or inductive elements. Such interstage coupling devices have limited band width characteristics, and also are relatively bulky. It is therefore an object of the present invention to provide an ultrasonic amplifier having a plurality of stages coupled by novel interstage coupling devices which provide narrower frequency pass bands, are less bulky, and are inexpensive.

The present inventor has found that an interstage coupling unit for an ultrasonic amplifier formed by two or more piezoelectric elements which are resonant at the band pass frequency and which are mechanically or acoustically coupled satisfies the foregoing object. In addition, the piezoelectric interstage coupling unit may be constructed in a manner substantially the same as the ultrasonic microphone in order to facilitate alignment of the frequency response range of the microphone with the pass band of the amplifier.

As in all electrical devices, it is desirable to minimize the number of parts utilized in order to reduce the cost of the unit. The inventor has found that an inexpensive device for detecting the presence of ultrasonic waves within the response range of a microphone is to utilize the heterodyne principle with a local oscillator having approximately the same frequency of resonance as the pass band of the ultrasonic amplifier, and detect the difference frequencies in a headset. The inventor has also found that the frequency controlling element of the local oscillator may be the same piezoelectric coupling unit utilized between stages of the ultrasonic amplifier, thus providing assurance that the local oscillator will have a resonant frequency within the pass band of the amplifier and avoiding the need for an additional frequency determining element for the local oscillator.

The present invention also may be utilized to detect the presence of ultrasonic vibrations in mechanical structures, rather than acoustical ultrasonic waves. In addition, the present invention may be utilized to provide an acoustical link between units for detecting the presence of ultrasonic waves and units for responding to the electrical signals detected.

These and further advantages and objects of the present invention will be readily appreciated by those skilled in the art from a further consideration of this specification, particularly when viewed in the light of the drawings, in which:

FIG. 1 is an elevational view of the casing of a leak detector constructed in accordance with the teachings of the present invention;

FIG. 2 is an end elevational view of the casing of the leak detector of FIG. 1;

FIG. 3 is a schematic electrical circuit diagram of the leak detector utilizing the casing of FIGS. 1 and 2;

FIG. 4 is a schematic diagram of an ultrasonic microphone for use with the leak detector of FIGS. 1 through 3;

FIG. 5 is a partly schematic diagram of a mechanical ultrasonic vibration transducer for use with an ultrasonic amplifier and detector of the type set forth in FIG. 3;

FIG. 6 is a schematic electrical circuit diagram of a remote detector for use with an ultrasonic leak detector of the type set forth in FIGS. 1 through 4; and FIG. 7 is a schematic electrical circuit diagram of an alternate form of indicator for the detection of ultrasonic waves such as produced by a leak.

As illustrated in FIG. 1, a leak detector according to the present invention may be constructed in the form of a round cylindrical unit not much larger than a pen light. FIG. 1 illustrates a cylindrical casing 10 having a circular screen 12 at one end for admitting ultrasonic waves into the casing 10. A combination on-off switch and sensitivity control 14 rotatably protrudes from the casing 10 near the rear end thereof, and a connector 16 protrudes from the end of the casing 10 opposite the screen 12 to permit a headset 18 to be electrically connected to circuits disposed within the casing 10.

An ultrasonic transducer 20 is disposed within the casing confronting the screen 12 and electrically connected to the input of a detection unit 22, the electrical circuit diagram of the unit 22 being illustrated in FIG. 3. The electrical detection unit 22 utilizes a battery 24 which is mounted within the casing adjacent to the end opposite the screen 12.

The ultrasonic transducer, or microphone 20 is of the type illustrated in Pat. No. 3,109,111 of Oct. 29, 1963 issued to Alpha M. Wiggins, and is diagrammatically set forth in FIG. 4. This microphone 20 utilizes two piezoelectric elements 26 and 28 which are electrically connected in series. Each of the elements 26 and 28 consist of two flat rectangular plates 30 and 32 of piezoelectric material, such as barium titinate and lead zirconium titinate, and the two plates and 32 are bound together in a sandwich by a common central electrode 34. The plate 30 also has an electrode 36 on the surface thereof opposite the electrode 34, and the plate 32 also has an electrode 38 on the surface thereof opposite the electrode 34. The piezoelectric plates 30 and 32 are polarized oppositely relative to the common electrode 34, that is, the polarization vectors extend either from the common electrode 34 toward the outer electrodes 36 and 38, or from the outer electrodes 36 and 38 to the common electrode 34. Both of the elements, however, are polarized electrically in the same manner with respect to the common electrode 34.

The elements 26 and 28 are supported by a common mounting member 40. The element 26 is mounted between the member 40 and a separate support member 42, while the element 28 is mounted between the mounting member 40 and its separate support member 44. As is more fully described in the above referred to Wiggins patent, the support members 42 and 44 have downwardly extending tabs 46 and 48 which engage opposite sides of the rectangular elements 26 and 28 centrally, and the support member 40 has similar lugs which engage the central portion of the other two sides of each of the elements 26 and 28 in order to provide the desired mode of vibration of the elements 26 and 28. The elements 26 and 28 are designed to resonate within the ultrasonic frequency range, preferably at a frequency of the order of 40 kilocycles.

As is clear from FIG. 4, each of the elements 26 and 28 resonates independently in response to acoustical waves impressed thereon, and the electrical output of the two elements 26 and 28 is summed by connecting the elements in series, one output terminal 50 being connected to the electrode 42, and the other output terminal 52 being electrically connected to the electrode 44 of the element 28.

When used as a microphone, both elements 26 and 28 are driven, and coupling between the element 26 and the element 28 is preferably solely acoustical. Acoustical coupling is also preferred when the unit is used as an interstage coupler. If one element 26 is driven, acoustical waves generated by the element 26 will drive the element 28, thus causing the element 28 to produce an output. However, the element 40 may also be used to provide mechanical coupling between the elements 26 and 28, and may be mechanically resonant in the response range of the unit.

FIG. 3 illustrates the electronics unit 22 which is electrically connected between the microphone 20 and the headset 18. Electronics unit 22 has an amplifier 54 with input terminals 56 and 58 electrically connected to the output terminals 50 and 52 of the microphone 20. The output of the amplifier 54 appears across output terminals 60 and 62 which are electrically connected to a narrow band amplifier 64 having a band pass frequency approximately equal to the resonate frequency of the microphone 20. The band pass amplifier 64 also includes a local oscillator 66, and the output of the band pass amplifier and local oscillator is electrically connected to a mixer 68. The output of the mixer 68 is electrically connected to an audio amplifier 70.

The amplifier 54 is a two stage amplifier employing transistors 72 and 74. The transistor 72 is connected in a grounded emitter circuit with the collector 76 of the transistor 72 connected to the base 78 of the transistor 74. The transistor 74 is connected in a grounded collector circuit, and the output of the amplifier 54 is connected through a capacitor 80 to the terminal 60. It will be noted that the amplifier 54 is a wide band amplifier and is capable of passing signals beyond the frequency of resonance of the microphone 20.

The narrow pass band amplifier 22 employs a transistor 82 with a base 84 connected to the terminal 60. The terminal 62 forms a common connection for all stages of the electronics unit 22, and the emitter 86 of the transistor 82 is connected to the terminal 62. A two element ceramic coupler unit 88 is electrically connected between the collector 90 of the transistor 82 and the mixer stage 68 through two condensers 92 and 94 connected on opposite sides of the piezoelectric unit 88. The piezoelectric unit 88 is of substantially the same construction as the microphone 20, as illustrated in FIG. 4, however, a third terminal 96 extends from the unit 88 and is electrically connected to the interconnected electrodes 38 of the two piezoelectric elements 26 and 28, and the terminal 96 is connected to the common electrode or terminal 62.

It will be noted that the transistor 82 is connected in a grounded emitter amplifier circuit, and electrical signals appearing between the emitter and the collector of the transistor 82 are impressed on the piezoelectric element 26 across its two opposite electrodes 36 and 38. As a result, the piezoelectric element 26 will flex, and since the microphone 20 is mechanically resonant at the same frequency as the piezoelectric element 26, the exciting electrical signals will also be at the resonant frequency of the piezoelectric element 26, thus causing the element 26 to achieve mechanical resonance. The piezoelectric element 26 is acoustically coupled to the piezoelectric element 28, thus setting the element 28 in mechanical resonance since it also is mechanically resonant at approximately the same frequency as the microphone 20. The mechanical support member 40 which mounts the piezoelectric elements 26 and 28 may also be fabricated to be mechanically resonant at the resonant frequency of the microphone to provide a mechanical coupling between the members 26 and 28. Thus, the coupling between the piezoelectric members 26 and 28 may either be acoustical, mechanical, or a combination of acoustical and mechanical. Because of the fact that production schedules require the microphone 20 and the coupler unit 88 to be substantially identical, acoustical coupling is utilized in the preferred construction.

Mechanical resonance of the piezoelectric element 28 results in the generation of electrical signals having a frequency of the mechanical resonance on the electrodes 38 and 44 of the piezoelectric element 28, and hence the electrical signals generated on the electrodes of the piezoelectric element 28 form the output of the narrow band pass amplifier 22 and appear between the common terminal 62 and the terminal of the capacitor 94 connected to the mixer 68.

The piezoelectric unit 88 is also utilized as the frequency control element of the local oscillator. The local oscillator utilizes a transistor 96, and the piezoelectric element 28 of the unit 88 is connected in a circuit with the base 98 and emitter 100 of the transistor 96. The piezoelectric element 26 of the unit 88 is connected in a closed circuit between the collector 102 and the emitter 100 of the transistor 96. Since the piezoelectric element 26 is acoustically coupled to the piezoelectric element 28, the requisite feedback is provided between the two circuits, resulting in oscillation. Since the piezoelectric element 28 is electrically connected in the output circuit of the narrow band amplifier 64, the electrical signals from the oscillator circuit are also present in the output circuit, as well as sum and difference electrical signals.

The mixer 68 has a transistor 104, and the output of the narrow pass amplifier and local oscillator stage 64 is impressed upon the base 106 of the transistor 104. The transistor 104 is connected in a grounded emitter circuit, and the sum and difference signals in amplified form appear upon the collector 106 of the transistor 104. A capacitor 108 connected between the collector and the common terminal 62 bypass those frequencies above the audio range so that a capacitor 110 connected between the collector 106 and the audio amplifier 70 conducts primarily audio signals to the audio amplifier 70. The audio amplifier 70 utilizes a transistor 112 connected in a grounded emitter amplifier circuit, and the headset 18 is connected between the power source 24 and the collector 114 of the transistor 112 through a potentiometer 116. The potentiometer 116 has a knob 14, illustrated in FIG. 1, for controlling the magnitude of the signal impressed on the headset 18.

The microphone 20 responds to ultrasonic waves having a frequency within its frequency of resonance, and converts these ultrasonic waves to electrical signals which are impressed upon the terminals 56 and 58 of the electronics unit 22. The electrical signals impressed upon the input of the amplifier 54 will not be at the exact frequency of the local oscillator but will be within the pass band of the pass band amplifier 64 as controlled by the ultrasonic unit 88. As a result, there will be a finite difference frequency, and the difference frequency will not exceed one-half of the pass band of the amplifier 64, assuming the local oscillator 66 to have a resonate frequency at the center of the pass band. Hence, the difference frequency is well within the audible range, and can be detected in the earphones 18.

The microphone 20 may be replaced by a vibration responsive probe illustrated in FIG. 5. The probe utilizes two ceramic plates 118 and 120 mounted between three electrodes 122, 124, and 126 to form a sandwich. The electrodes 122 and 126 are electrically connected to the terminals 56 and 58 of the electronics unit 22. A central bore 128 extends through the electrodes 122, 124, 126 and the ceramic plates 118 and 120, and a bar 130 of rigid electrically insulating material is securely fastened within the bore 128.

The ceramic plates 118 and 120 are polarized oppositely with respect to the center electrode 124 to form a bimorph construction, and vibrations impressed between the center of these plates and the perimeter of the plates will result in the generation of electrical voltages on the electrodes 122 and 126 of opposite polarity. A casing 132 is mounted on the perimeter of the plates 118 and 120 to permit the probe to be held in fixed position relative to the vibrating surface so that the bar 130 may be placed in abutment with the vibrating surface. The bar 130 and the plates 118 and 120 are constructed to be resonant at approximately the resonant frequency of the local oscillator, or in other words, at a frequency central of the pass band of the pass band amplifier 64.

Since corona and electrical arcs generate ultrasonic waves, a leak detector of the type described in FIGS. 1 through 4 will detect electrical leakage as well as gas leakage. However, electrical leakage presents a danger to the operator, since contact with high voltage could result in placing the operator in the circuit of least resistance to the high voltage. For this reason, it is desirable to utilize an elongated insulating rod, diagrammatically shown at 134 in FIG. 6, and to mount a remote probe 136 at the end of the rod, and the leak detector itself, designated 138 adjacent to the operator and spaced from the remote probe 136. The remote probe 136 utilizes an output ultrasonic radiator 140 which transmits ultrasonic energy through the atmosphere to the leak detector 138, thereby providing complete isolation between the leak detector 138 and the region of high voltage for the safety of the operator.

As indicated in FIG. 6, the remote probe comprises a microphone 20 identical to the microphone utilized in the leak detector itself. The microphone 20 is connected to a three stage transistor amplifier designated 142, and each of the three stages of the amplifier 142 are coupled together by an ultrasonic coupling unit 88 identical to the coupling unit 88 utilized in the narrow band pass amplifier 64. The microphone 20, coupling units 88, and output transducer 140 are all resonant at approximately the same frequency, and this frequency must be approximately the resonant frequency of the local oscillator of the electronics unit 22. The output transducer 140 is preferably constructed in a manner identical to the microphone 20 to produce efficient output and to readily achieve the desired resonant frequency.

The electronics unit of FIG. 3 produces an audio response in the headphones at a frequency determined by the frequency of the ultrasonic radiation set up by the turbulence in the air resulting from a leak. There is some background noises at all times in the handset 18 in the electronics unit of FIG. 3. Hence, it is possible for one checking for a leak to become complaisant and to fail to heed the unexpected appearance of an audio signal in the headset. In the embodiment of FIG. 7, the headset 18 is silent until the microphone 20 picks up sufficient ultrasonic waves having a frequency within its mechanical resonance to excite a tone oscillator 144 which in turn drives the headset 18 to full output.

In the embodiment of FIG. 7, the microphone 20 is connected to a three stage amplifier which is substantially identical to that of the amplifier 142 illustrated in FIG. 6. The output of the three stage amplifier 142 is impressed upon a gain control stage 146 which has a transistor 148. The transistor 148 has a base 150 connected to the collector of the final transistor 152 of the amplifier 142 through a capacitor 154. The base 150 is biased positively by means of a potentiometer 156 having a tap connected to the positive terminal of the power source 24 through two serially connected resistors 158 and 160. The junction between the resistors 158 and 160 is connected to the negative terminal of the power source 24 through two diodes 162 and 164 connected to pass positive charges to the negative terminal of the power source 24. A bias resistor 166 is connected between the base 150 of the transistor 148 and the negative terminal of the power source. In this manner, a very stable source of positive potential is placed on the base 150, and adjustment of the potentiometer 156 determines the magnitude of this bias. The transistor 148 responds to the negative portion of signals impressed thereon, and hence the sensitivity of the entire device is determined by the magnitude of the positive potential on the base 150 as adjusted by the potentiometer 156. The potentiometer 156 generally is provided with a readily accessible knob, such as the knob 14 of FIG. 1.

The output of the gain control stage 146 is connected through a direct current amplifier 168 having a transistor 170 connected in a grounded emitter circuit. The transistor 170 has a collector 172 connected to the base 174 of a transistor 176 in the phase shift oscillator 144 through a resistor 178. The headset 18 is connected between the positive terminal of the power source 24 and the collector 180 of the transistor 176. Three capacitors 182, 184 and 186 are connected between the base 174 and collector 180 of the transistor 176. A resistor 188 is connected between the junction of the capacitor 182 and 184 and the negative terminal of the power source 24 and a second resistor 190 is connected between the junction of the capacitor 184 and the capacitor 186 and the negative terminal of the power source 24. A capacitor 192 is connected in parallel with the power source 24.

When the microphone 20 senses ultrasonic radiation, a series of negative pulses appear on the collector 172 of the transistor 170, and these pulses lower the bias on the base 174 of the transistor 176 and permit the transistor to conduct in a normal manner. As a result, the relaxation oscillator is free to oscillate and generates a tone in the headset 18.

Those skilled in the art will readily devise many modifications of the present invention in addition to the embodiments heretofore set forth. In addition, utilities of the present invention will be readily foreseen by application of the present disclosure. It is therefore intended that the scope of the present invention be not limited by the foregoing disclosure, but rather only by the appended claims.

The invention I claim is:

1. An ultrasonic acousto-electrical transducer comprising in combination a first amplifier stage having an input circuit and an output circuit; a second amplifier stage having an input circuit; and an ultrasonic coupling unit having two piezoelectric elements, each of said elements having two electrodes and developing potentials of opposite sign on said electrodes responsive to flexure, one of said elements being electrically connected in series with the output circuit of the first amplifier stage and the other of said elements being electrically connected in series with the input circuit of the second amplifier stage, said coupling unit having means for mounting the first and second elements for mechanical resonance at approximately the same frequency, said first and second elements being coupled vibrationally, whereby an electrical signal in the output of the first amplifier stage at the resonant frequency of the first element results in mechanical resonance of the first and second elements and the electrical potentials developed across the electrodes of the second element are impressed on the input circuit of the second amplifier stage, and an ultrasonic microphone having a piezoelectric element coupled electrically to the input circuit of the first amplifier stage, the piezoelectric element of said microphone having a mechanical frequency of resonance approximately equal to the mechanical frequency of resonance of the piezoelectric elements of the coupling unit.

2. An ultrasonic detector comprising the combination of claim 1 in combination with an audio responsive device electrically connected to the output of the second stage.

3. A vibration detector comprising a first amplifier state having an input circuit and an output circuit; a second amplifier stage having an input circuit; and an ultrasonic coupling unit having two piezoelectric elements, each of said elements having two electrodes and developing potentials of opposite sign on said electrodes responsive to flexure, one of said elements being electrically connected in series with the output circuit of the first amplifier stage and the other of said elements being electrically connected in series with the input circuit of the second amplifier stage, said coupling unit having means for mounting the first and second elements for mechanical resonance at approximately the same frequency, said first and second elements being coupled vibrationally, whereby an electrical signal in the output of the first amplifier stage at the resonant frequency of the first element results in mechanical resonance of the first and second elements and the electrical potentials developed across the electrodes of the second element are impressed on the input circuit of the second amplifier stage; and a probe transducer adapted to be placed in abutment with a surface having vibrations to be detected, said probe transducer having a piezoelectric element electrically connected to the input of the first stage and having a mechanical frequency of resonance approximately equal to the mechanical frequency of resonance of the piezoelectric elements of the coupling unit.

4. An ultrasonic detector comprising the combination of claim 1 wherein the first amplifier stage includes an electron valve having two terminals, electrons entering through the valve through the first terminal and leaving the valve through the second terminal, and the charge on the third terminal controlling the flow of electrons through the valve, one of the elements of the ultrasonic coupler being electrically connected to the first and second terminals of the electron valve and the other element of the ultrasonic coupler being electrically connected between the third and second terminals of the electron valve, the electron valve and ultrasonic coupler being connected in an oscillator circuit having a resonant frequency controlled by the mechanical resonance of the piezoelectric elements of the ultrasonic coupler unit, whereby the stage functions as a mixer stage.